(12) United States Patent
Kishimoto et al.

(10) Patent No.: US 10,971,744 B2
(45) Date of Patent: Apr. 6, 2021

(54) METHOD FOR INSPECTING CURRENT LEAK OF FUEL CELL

(71) Applicant: HONDA MOTOR CO., LTD., Tokyo (JP)

(72) Inventors: Masaaki Kishimoto, Tochigi (JP); Hiroyuki Yamagishi, Tochigi (JP); Hiroshi Sakai, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 225 days.

(21) Appl. No.: 16/288,769

(22) Filed: Feb. 28, 2019

(65) Prior Publication Data

US 2019/0296379 A1 Sep. 26, 2019

(30) Foreign Application Priority Data

Mar. 23, 2018 (JP) ............................. JP2018-056759

(51) Int. Cl.
*H01M 8/04* (2016.01)
*H01M 8/04537* (2016.01)
*H01M 8/1004* (2016.01)

(52) U.S. Cl.
CPC ..... *H01M 8/04582* (2013.01); *H01M 8/1004* (2013.01)

(58) Field of Classification Search
None
See application file for complete search history.

(56) References Cited

U.S. PATENT DOCUMENTS

2014/0239962 A1* 8/2014 Oda ................. H01M 8/04582
324/426

FOREIGN PATENT DOCUMENTS

JP 2013-054925 3/2013

* cited by examiner

*Primary Examiner* — Wyatt P McConnell
(74) *Attorney, Agent, or Firm* — Rankin, Hill & Clark LLP

(57) ABSTRACT

Provided is a method for inspecting a current leak of a fuel cell, which is provided with an anode electrode, a cathode electrode, and an electrolyte membrane sandwiched between the anode electrode and the cathode electrode, the method including: a first process in which a first voltage, which is a limit voltage of the electrolyte membrane, is applied to the fuel cell; a second process in which a second voltage, which is lower than the first voltage, is applied to the fuel cell after the first process; a third process in which a third voltage, which is lower than the second voltage, is applied to the fuel cell after the second process; and a determination process in which a value of a current flowing through the fuel cell in the third process is detected, and whether the detected current value is lower than a prescribed current value is determined.

2 Claims, 6 Drawing Sheets

METHOD FOR INSPECTING CURRENT LEAK OF FUEL CELL

This application is based on and claims the benefit of priority from Japanese Patent Application No. 2018-056759, filed on 23 Mar. 2018, the content of which is incorporated herein by reference.

BACKGROUND OF THE INVENTION

Field of the Invention

The present invention relates to a method for inspecting a current leak of a fuel cell.

Related Art

Recently, from a viewpoint of environmental conservation or sustainable use of energy, a demand for a fuel cell is rapidly increasing. In the fuel cell, a fuel gas containing hydrogen and an oxidant gas containing oxygen such as the air are electrochemically reacted and electrical energy is extracted from chemical energy retained in each gas. A solid polymer type fuel cell, which is one of fuel cells, is provided with a membrane electrode assembly (MEA) holding an electrolyte membrane between a positive electrode (cathode) and a negative electrode (anode).

There is a case in which an electronic shielding function of the MEA is reduced (leaked out) by a scratch occurring in a hot press molding process or in handling, a defect in film occurring by vaporization of carbon in the MEA, or penetration of a carbon fiber. Since the defect causes a performance degradation at the time of charging and discharging of the fuel cell, an MEA having a non-allowable performance degradation should be detected as having not sufficient quality. As the detection method, there is a conventionally known method which applies a constant DC voltage to an MEA, measures a stationary current value of the MEA, and detects the MEA in which a current leak occurs.

However, in the above inspection method, it takes time till the current flowing at the time of applying the DC voltage to the MEA becomes the stationary current, and a time taken in the inspection process of the MEA is connected to a decline of a production efficiency of the fuel cell.

In addition, when a defect has occurred in the MEA, a fuel gas and an oxidizing gas directly react during use of the cell, heat of the reaction causes further deterioration in the MEA around the defect, and this deterioration causes further degradation in performance of the cell.

In order to address the above-described problem, Patent Document 1 discloses a method for shortening a charging time by applying a higher voltage than an inspection voltage before applying a voltage for fixing a current value in a current leak inspection of an MEA. This can shorten an inspection process time of the MEA.

Patent Document 1: Japanese Unexamined Patent Application, Publication No. 2013-054925

SUMMARY OF THE INVENTION

However, as described in Patent Document 1, when a voltage applied for inspecting a leak drops, a reverse current is generated at electrodes at an instant when the applied voltage is switched, and an instant current value greatly swings to a negative value and then immediately returns to a positive value. In particular, fluctuation of the current value becomes differed by a voltage condition or the like, and when the fluctuation of the current value becomes large, it takes a long time to be stabilized. Accordingly, when the inspection is performed in a state where the current value is not stabilized, it causes a degradation in inspection accuracy.

The present invention is to address the above-described problem, and an object thereof is to improve a production efficiency and quality of a product by shortening a time taken for inspection and improving inspection accuracy in the inspection process of the fuel cell.

(1) The present invention provides a method for inspecting a current leak of a fuel cell, which is provided with an anode electrode, a cathode electrode, and an electrolyte membrane sandwiched between the anode electrode and the cathode electrode, the method including: a first process in which a first voltage, which is a limit voltage of the electrolyte membrane, is applied to the fuel cell to be inspected; a second process in which a second voltage, which is lower than the first voltage, is applied to the fuel cell after the first process; a third process in which a third voltage, which is lower than the second voltage, is applied to the fuel cell after the second process; and a determination process in which a value of a current flowing through the fuel cell in the third process is detected, and whether the detected current value is lower than a prescribed current value is determined.

According to invention (1), a cell charging time in inspection of a current leak can be shortened by applying a first voltage that is a limit voltage of an electrolyte membrane. In addition, a reverse current associated with a drop of an application voltage can reduced and a fluctuation of a current value can be relieved by dropping the application voltage step by step from a first voltage to a third voltage. Thus, according to the present invention, in the inspection process of a fuel cell, a time taken for inspection can be shortened, inspection accuracy can be improved, a production efficiency and quality of a product can be improved.

(2) In the invention (1), it is preferable that a voltage application time in the second process is longer than a voltage application time in the first process.

According to the invention (2), after performing quick charging with the limit voltage, during a longer time than that, a lower second voltage is applied so as to stabilize a current value, and thus it can be surely achieved to charge in a short time and to relieve fluctuation of a current value.

According to the present invention, in an inspection process of a fuel cell, a production efficiency and quality of a product can be improved by shortening a time taken for inspection and improving inspection accuracy.

DETAILED DESCRIPTION OF THE INVENTION

Hereinafter, embodiments of the present invention will be described with reference to accompanied drawings, but the present invention is not limited thereto.

<Configuration of Solid Polymer Type Fuel Cell>

Figure 1:
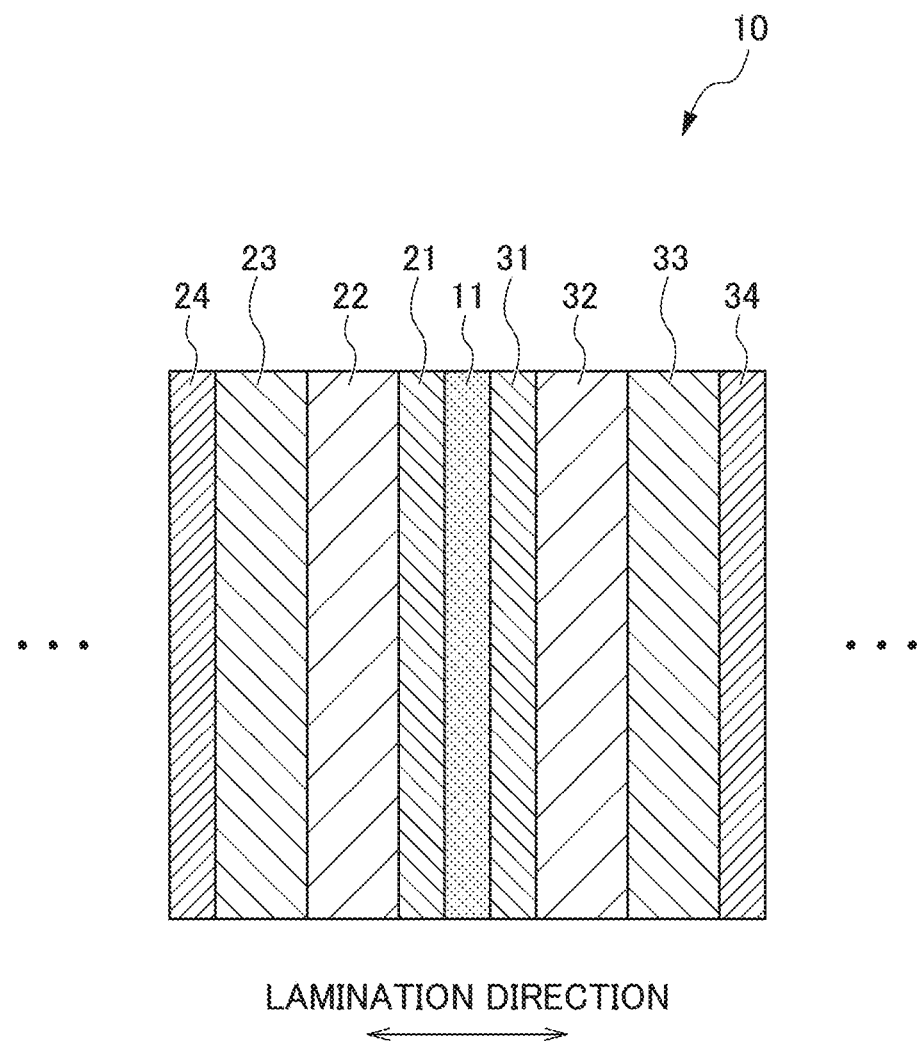
FIG. 1 is a diagram schematically illustrating a unit cell according to an embodiment of the present invention.

A fuel cell 100 is adopted as a fuel cell stack by laminating a plurality of unit cells 10 illustrated in FIG. 1, and the plurality of unit cells 10 are connected so as to be in series. The unit cell 10 is provided with an electrolyte membrane 11 in the center in which an anode electrode layer 21 and an anode gas diffusion layer 22 are provided in one side thereof (left in FIG. 1) and a cathode electrode layer 31 and a cathode gas diffusion layer 32 are provided in the other side (right in FIG. 1).

On opposite sides of the anode and cathode gas diffusion layers 22 and 32 to the electrolyte membrane 11, anode and cathode separators 23 and 33 are disposed respectively. The anode and cathode separators 23 and 33 form gas passages 23a and 33a for evenly spreading reaction gases (anode side: hydrogen, cathode side: air) on the respective surfaces of the anode and cathode electrode layers 21 and 31, and deliver a current generated by the unit cell 10 to an adjacent unit cell 10.

An anode electrode is formed of the anode electrode layer 21, the anode gas diffusion layer 22, and the anode separator 23, and a cathode electrode is formed of the cathode electrode layer 31, the cathode gas diffusion layer 32, and the cathode separator 33.

Furthermore, on opposite sides of the anode and cathode separators 23 and 33 to the gas passages 23a and 33a, anode and cathode cooler plates 24 and 34 are disposed. The anode and cathode cooler plates 24 and 34 are provided with refrigerant passages 24a and 34a through which a refrigerant playing a role of removing excessive waste heat having been generated in the fuel cell 100 circulates, and play a role of a conductor that delivers a current generated by the unit cell 10 to an adjacent unit cell 10.

The above-described gas diffusion layers 32 and 33 uniformly spread reaction gases (anode side: hydrogen, cathode side: air) on the respective surfaces of anode and cathode electrode layers 21 and 31, rapidly discharge water generated at the cathode side by electrochemical reaction of hydrogen and oxygen to the gas passages 33a, and further deliver a current generated by each electrodes layers 21 and 31 to the anode and cathode separators 23 and 33.

In addition, the anode electrode layer 21 causes the following hydrogen electrode reaction by adopting, as a reactant, hydrogen supplied from the gas diffusion layer 13 of the anode side.

$$H_2 \rightarrow 2H^+ + 2e^- \qquad (1)$$

On the other hand, the cathode electrode layer 31 causes the following water generation reaction by adopting, as a reactant, a proton generated at the anode electrode, transmitted through the electrolyte membrane 11, and reached the cathode side, and oxygen included in the air and supplied from the gas diffusion layer 32 of the cathode side.

$$O_2 + 4H^+ + 4e^- \rightarrow 2H_2O \qquad (2)$$

Figure 2:
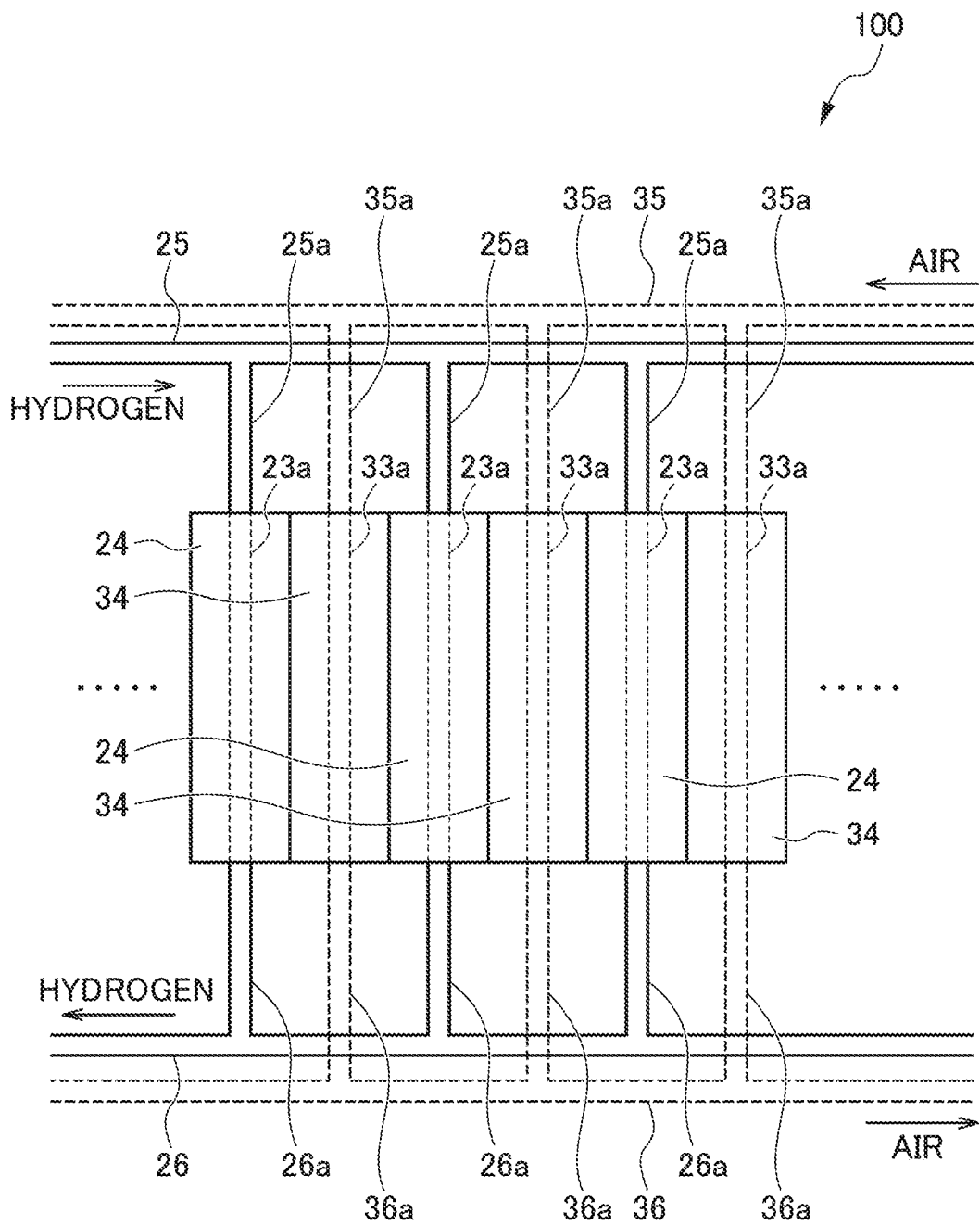
FIG. 2 is a diagram schematically illustrating a fuel cell according to an embodiment of the present invention.

FIG. 2 is a schematic diagram illustrating a part of fuel cell stack in which the above-described plurality of unit cells 10 are laminated, and here, the unit cells 10 only illustrate the anode and cathode separators 23 and 33 respectively forming the anode and cathode electrodes. In each of the unit cells 10, a voltage from 0.5 to 1 V is generated, depending on a load current. As the fuel cell stack, a voltage of total about 150 to 300 V can be obtained by connecting the unit cells 10 of 300 to 400 in number in series.

In an upper part of FIG. 2 of the fuel cell stack, a hydrogen gas inlet manifold 25 and an air inlet manifold 35, which are extended in the laminated direction of the unit cells 10, are respectively provided. In addition, in a lower part of FIG. 2 of the fuel cell stack, a hydrogen gas outlet manifold 26 led to the hydrogen gas inlet manifold 25 and an air outlet manifold 36 led to the air inlet manifold 35, which are extended in the laminated direction of the unit cells 10, are respectively provided.

The hydrogen gas inlet manifold 25 is connected to inlets of the gas passages 23a of the anode separator 23 through branch passages 25a respectively connected to the unit cells 10. Outlets of the gas passages 23a are connected to the hydrogen gas outlet manifold 26 through branch passages 26a. The air inlet manifold 35 is connected to inlets of the gas passages 33a of the cathode separator 33 through branch passages 35a respectively connected to the unit cells 10. Outlets of the gas passage 33a are connected to the air outlet manifold 36 through branch passages 36a.

In the anode side, the hydrogen gas is distributed to each of the gas passages 23a from the hydrogen gas inlet manifold 25 and is supplied to each of the unit cells. A non-reacted hydrogen gas is collected from the hydrogen gas outlet manifold 26, after passing through the gas passages 23a. In the cathode side, the air is distributed to each of the gas passages 33a from the air inlet manifold 35 and is supplied to each of the unit cells. A non-reacted air is collected from the air outlet manifold 36, after passing through the gas passages 33a.

As described above, the membrane electrode assembly (MEA) 110 is provided with the anode electrode on one side surface of the electrolyte membrane 11, and the cathode electrode on the other side surface thereof. The electrolyte membrane 11 is an ion exchange membrane formed of a fluorine-based resin material or a hydrocarbon-based resin material, and has excellent proton conduction in a wet state. The anode electrode layer 21 and the cathode electrode layer 31 are layers providing a catalyst for promoting an electrode reaction, and are formed of materials including, for example, a carbon carrying platinum and the electrolyte. The anode gas diffusion layer 22 and the cathode gas diffusion layer 32 are layers in which the reaction gas (air and hydrogen gas) to be used for the electrode reaction is diffused in a surface direction (a direction substantially perpendicular to the lamination direction (see FIG. 1) of the fuel cell 100), and are formed of, for example, a carbon cross or a carbon paper.

The separators 23 and 33 are formed of a dense and conductive material which does not transmit a gas, such as compression-molded dense carbon, a metal, or a conductive resin. The anode gas passage 23a and the cathode gas passage 33a are reaction gas passages that pass the reaction gas along the surface direction of the fuel cell 100, and are formed of a conductive porous material such as a metal porous body or a carbon porous body.

<Method for Inspecting a Current Leak>

Figure 3:
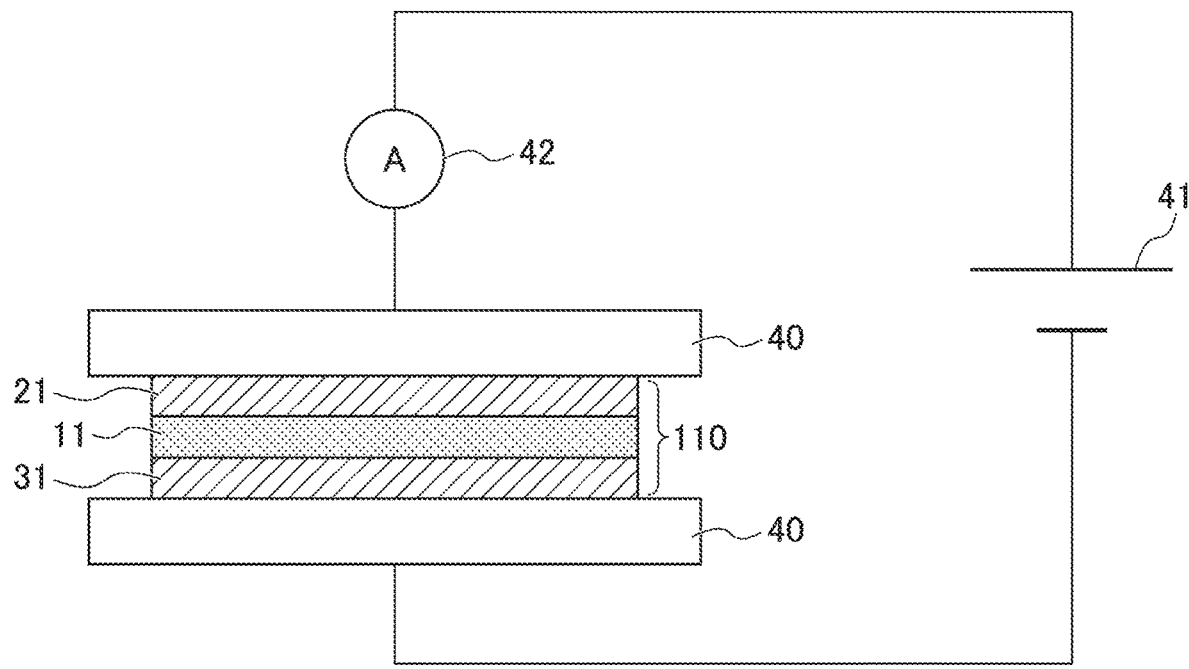
FIG. 3 is a diagram schematically illustrating a situation of inspecting a current leak according to an embodiment of the present invention.
Figure 4:
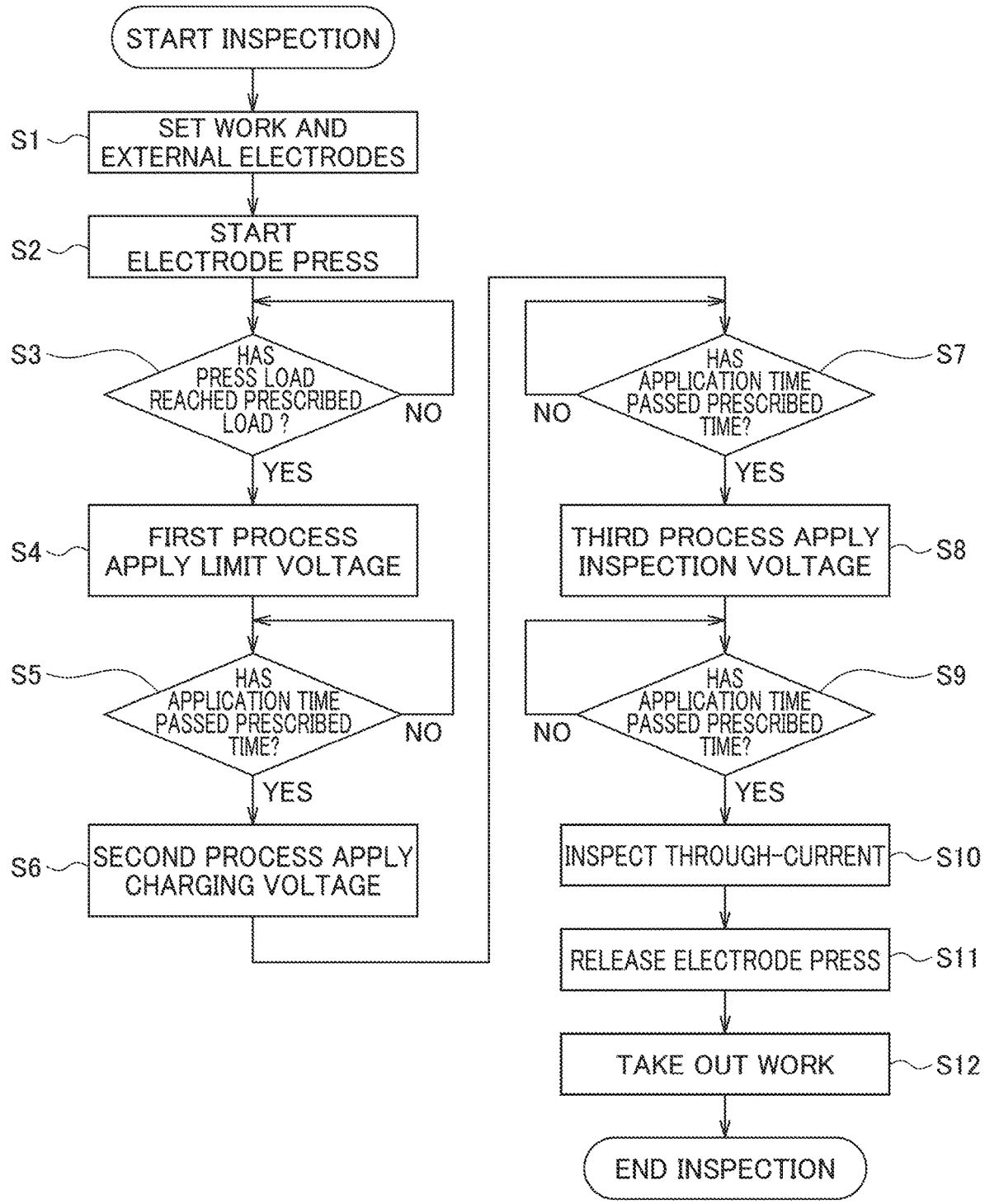
FIG. 4 is a flowchart illustrating a sequence of current leak inspection according to an embodiment of the present invention.

FIG. 3 is a diagram schematically illustrating a situation of inspecting a MEA 110 according to an embodiment of the present invention. FIG. 4 is a flowchart illustrating a sequence of inspection of the MEA 110 according to an embodiment of the present invention. In inspection of the MEA 110 in the present embodiment, a DC voltage is applied to the MEA 110, a current flowing through the MEA 110 at the time of the voltage application is detected, and it is determined whether there is a current leak (hereinafter, referred to as a "leak") in the MEA 110 on the basis of whether a detected current value is lower than a prescribed current value.

As illustrated in FIG. 3, the MEA 110 is interposed between a pair of external electrode plates 40 and a load is applied thereto by a press machine (not illustrated). Accordingly, the pair of external electrode plates 40 and the MEA 110 are fastened in a pressed state without a gap. The pair of external electrode plates 40 are connected to a DC power supply 41. In addition, between the pair of external electrode plates 40 and the DC power supply 41, an ammeter 42 is provided to be able to detect a value of a current flowing through the MEA 110.

With reference to FIG. 4, descriptions will be provided about a sequence of the method for inspecting a current leak according to the present embodiment. First, in step S1, the pair of external electrode plates 40 are set in a work to be inspected (MEA 110). In detail, as described above, the MEA 110 is interposed between the pair of external electrode plate 40. The setting can be performed automatically or manually.

Next, in step S2, a load is applied by the press machine (not illustrated) to start an electrode press. In detail, with respect to the pair of external electrode plates 40 holding the MEA 110, the load is applied by the press machine (not illustrated).

Next, in step S3, it is determined whether the press load reaches a prescribed load. When the determination is YES, the process proceeds to step S4, and when NO, the determination in the present step S3 is repeated.

Next, in step S4, as a first process, a limit voltage (a first voltage) of the electrolyte membrane is applied to the MEA 110. For example, 1.0 V is applied as the limit voltage (the first voltage) to the MEA 110.

Next, in step S5, it is determined whether an application time of the limit voltage (the first voltage) has passed a prescribed time. When the determination is YES, the process proceeds to step S6, and when NO, the determination in the present step S5 is repeated to the passage of the prescribed time.

Next, in step S6, as a second process, a charging voltage (a second voltage) is applied to the MEA 110. For example, with respect to the MEA 110, a voltage lower than the limit voltage (the first voltage) is applied as the charging voltage (the second voltage).

Next, in step S7, it is determined whether an application time of the charging voltage (the second voltage) has passed a prescribed time. When the determination is YES, the process proceeds to step S8, and when NO, the determination in the present step S7 is repeated to the passage of the prescribed time. Here, the prescribed time in step S7 is set to be longer than the above-described prescribed time in step S5.

Next, in step S8, as a third process, an inspection voltage (a third voltage) is applied to the MEA 110. For example, with respect to the MEA 110, a voltage lower than the charging voltage (the second voltage) is applied as the inspection voltage (the third voltage).

Next, in step S9, it is determined whether an application time of the inspection voltage (the third voltage) has passed a prescribed time. When the determination is YES, the process proceeds to step S10, and when NO, the determination in step S9 is repeated to the passage of the prescribed time. Here, the prescribed time in step S9 is set to be longer than the above-described prescribed time in step S7.

Next, in step S10, an inspection on a through-current of the MEA 110 is performed. In detail, a current value is measured in a state where the inspection voltage is applied, and it is determined whether the MEA 110 is normal by determining whether the measurement value exceeds a prescribed current value (a threshold value).

Next, in step S11, after the electrode press is released, and in step S12, the work (MEA 110) is taken out and the present inspection ends.

Hereinafter, the first process, the second process, and the third process of the present embodiments will be described in more detail. As described above, as the first voltage, 1.0 V which is a limit voltage of a solid polymer type fuel cell is applied (a charge acceleration voltage). In order to complete electric double layer formation at the charging voltage earlier, the limit voltage chargeable within the shortest time is applied for charge acceleration. However, in order to prevent deterioration of the electrode, it is preferable that the limit voltage is applied within a short time. For example, it is preferable to stop the application time of the first voltage within 1 second.

Then, a voltage lower than the first voltage is applied as the second voltage (the charging voltage). When the DC voltage is applied and charging starts, a value of the current flowing to the MEA 110 gradually increases to meet a certain peak, and the current value gradually decreases. This is because the current is generated in an electric double layer formation process, and when the formation is completed, the generation of the current, which is caused by the electric double layer formation, disappears. In addition, the charging voltage is made to be higher than the inspection voltage, and is lower than the limit voltage. Since an amount of the reverse current associated with a voltage drop can be reduced by dropping the voltage step by step, fluctuation of the current value can be small. As the second voltage, it is preferable to sufficiently perform the charging reaction and make the voltage difference with the third inspection voltage small. For example, it is preferable to apply the second voltage at 0.6 to 0.8 V, and more particularly, 0.7 V for 6 seconds.

Finally, the third voltage, which is the inspection voltage, is applied. The electric double layer in the third voltage is formed earlier by charging at the first and second voltage, and since the amount of the reverse current is small, the current value is stabilized earlier to a stationary value. Thereby, an inspection time can be shortened and the inspection accuracy can be also improved. As the third voltage, a voltage low enough to identify the leak current is preferable in order to improve inspection accuracy, and it is necessary to perform application during a time for stabilizing the current value sufficiently. For example, it is preferable to apply the third voltage at 0.3 V for 13 seconds.

As described above, the inspection voltage is preferably low so that a current flowing to parts other than a leak part becomes sufficiently small. Here, a resistance value of the MEA 110 to be inspected holds the property to become small, when the application voltage is high. Accordingly, when the inspection voltage is too high, there is no difference between resistance values of a defect part and a sound part of the MEA 110, and it becomes difficult to determine whether the defect part exists through the level of the current value. On the other hand, when the inspection voltage is low, it becomes difficult to measure a correct value in a short time, since a return of a current value after discharge, which is generated at the time of switching from the second voltage to the third voltage, is delayed, the value is slowly converged, and a negative current value is detected, etc.

It is determined whether the current value at the time of completing the application of the third voltage is higher or lower than a prescribed current value, and the MEA 110 detected to have the higher current value is considered such that a leak occurs due to existence of a defect, and is determined as a defective product. A prescribed current value (a threshold value) becomes differed according to the voltage, but it is preferable to be, for example, 5 mA at 0.3 V.

In order to provide more detailed descriptions about the above-described, successive changes in a current value at the time of applying a voltage will be provided for each case of (i) to (iii).

(i) When Only the Inspection Voltage is Applied

The current value gradually increases from the starting of the voltage application, meets a certain peak and gradually decreases, and is finally stabilized to a stationary value. At this time, an electric double layer is formed and the current value fluctuates by charges moving toward electrode interfaces. When the formation of the electric double layer is completed, the current value becomes the stationary value. In other words, the current value fluctuation is caused by an electric double layer formation.

(ii) When the Second Voltage (the Inspection Voltage) is Applied in a Second Step, after the First Voltage (the Charging Voltage)

A first electric double layer is formed by the first voltage applied to the MEA 110. Then, at an instance when the first voltage is switched and lowered to the second voltage, a part of the first electric double layer, which has been formed in the MEA 110 by the first voltage, is discharged and the current is reversed. Accordingly, when the application voltage is switched, a negative current value is detected. After the discharge ends, the current value immediately returns to a positive value, and formation of a new second electric double layer starts by the second voltage. Then, within a short time, the formation of the second electric double layer is completed and the current value becomes the stationary value. Since charging of a second electric double layer formation portion is completed earlier by the first voltage application, the current value can be stabilized within a shorter time than that in case (i).

However, when sufficient charging is not performed at the time of voltage switching, there is a risk that immediately after a return from the negative value, the current value increases and largely exceeds a final stationary value, since the second electric double layer formation starts in the initial to middle steps. In this case, it is difficult to set a determination time point of the current value, and when an inspection time is promoted to be short, there occurs a case where a current value exceeding a threshold value is detected even in a normal quality product to erringly determine as a defective product.

(iii) When the First to Third Voltages are Applied in Three Steps

Charging is accelerated at the second voltage by the first voltage, and the electric double layer formation sufficiently proceeds at the second voltage. Accordingly, at the time of applying the third voltage, since the formation of the electric double layer is completed earlier at the inspection voltage, the current value is converged to the stationary value earlier. In addition, since the voltage difference between the second voltage and the third voltage is small, an amount of a reverse current generated at the time of a voltage drop can be reduced, and the fluctuation of the current value becomes small. Accordingly, the variation of values around the stationary value becomes small, and highly accurate inspection can be performed with a small reading error.

Figure 5:
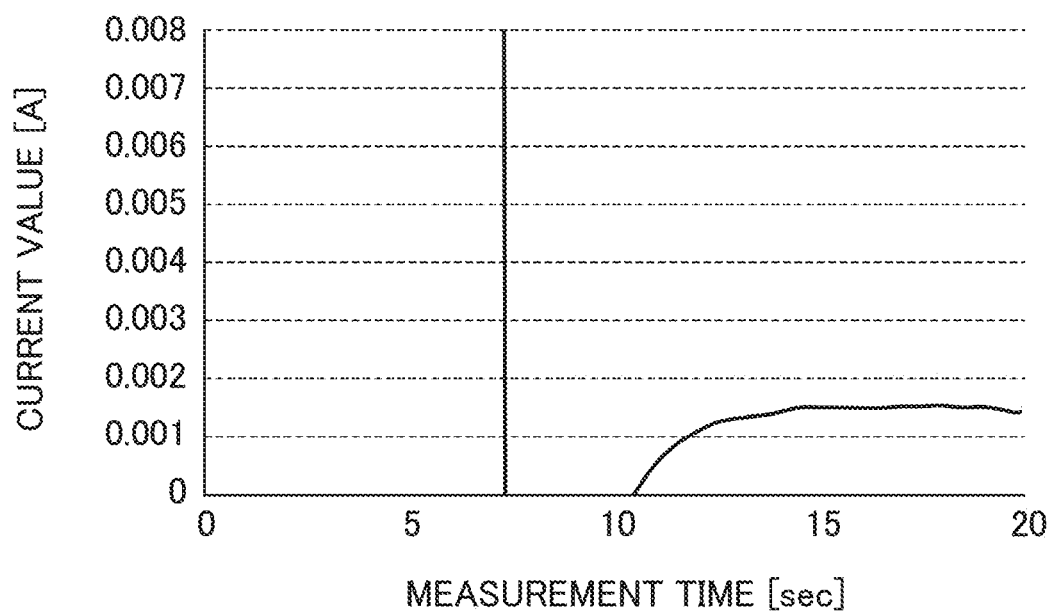
FIG. 5 is a diagram showing successive changes of a current value in current leak inspection according to Example 1 of the present invention.

Furthermore, the present invention is not limited to the three-step application, and a stepwise voltage application is repeated to make upward fluctuation small in the final converged value of the current value. Thus, after the application of the inspection voltage starts, the current value can be stabilized without a current value being equal to or greater than the threshold value at any time (FIG. 5). In this case, since there is no reason to detect the current value equal to or greater than the threshold value on the grounds that the current value is not sufficiently stabilized in the inspection voltage, when the current value equal to or greater than the threshold value is detected, it can be immediately determined to be caused by a leak.

Furthermore, the present invention is not restricted to the aforementioned embodiments, and modifications, improvements and the like are intended to be included within the scope of the present invention in the ranges in which the object of the present invention can be achieved.

EXAMPLES

Hereinafter, the inspection method of the present invention will be described on the basis of examples.

Example 1

The MEA 110 was inserted between external electrode plates, a load was applied thereon by a press machine, and the electrode plates and the MEA were press-bonded without a gap. In this state, a DC voltage of 1.0 V, which is the limit voltage of the MEA 110, was applied for 1 second. Then, a second voltage of 0.7 V was applied for 6 seconds, a third voltage of 0.3 V, which is the inspection voltage, was applied for 13 seconds. Meanwhile, a change in a value of the current flowing through the MEA was successively measured.

Comparative Example 1

Except that 0.5 V as a first voltage was applied for 4 seconds and a second voltage of 0.3 V, which is the inspection voltage, was applied for 16 seconds, the same process as that in Example 1 was done, and then a change in a value of the current flowing through the MEA was successively measured.

Comparative Example 2

Except that 0.6 V as a first voltage was applied for 7 seconds and a second voltage of 0.3 V, which is the inspection voltage, was applied for 13 seconds, the same process as that in Example 1 was done, and then a change in a value of the current flowing through the MEA was successively measured.

Figure 6:
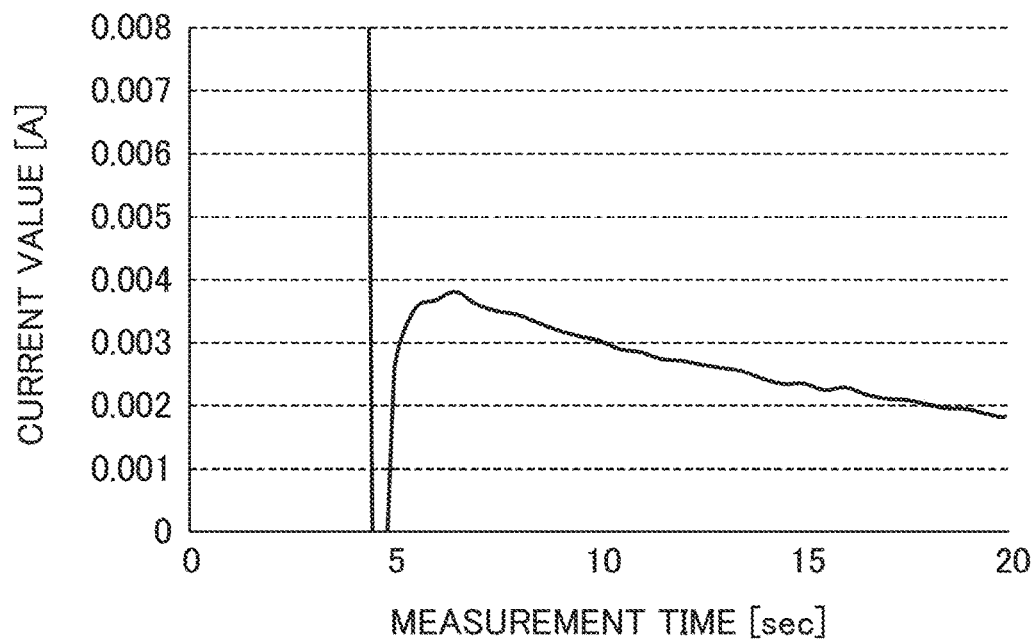
FIG. 6 is a diagram showing successive changes of a current value in current leak inspection according to Comparative Example 1 of the present invention.
Figure 7:
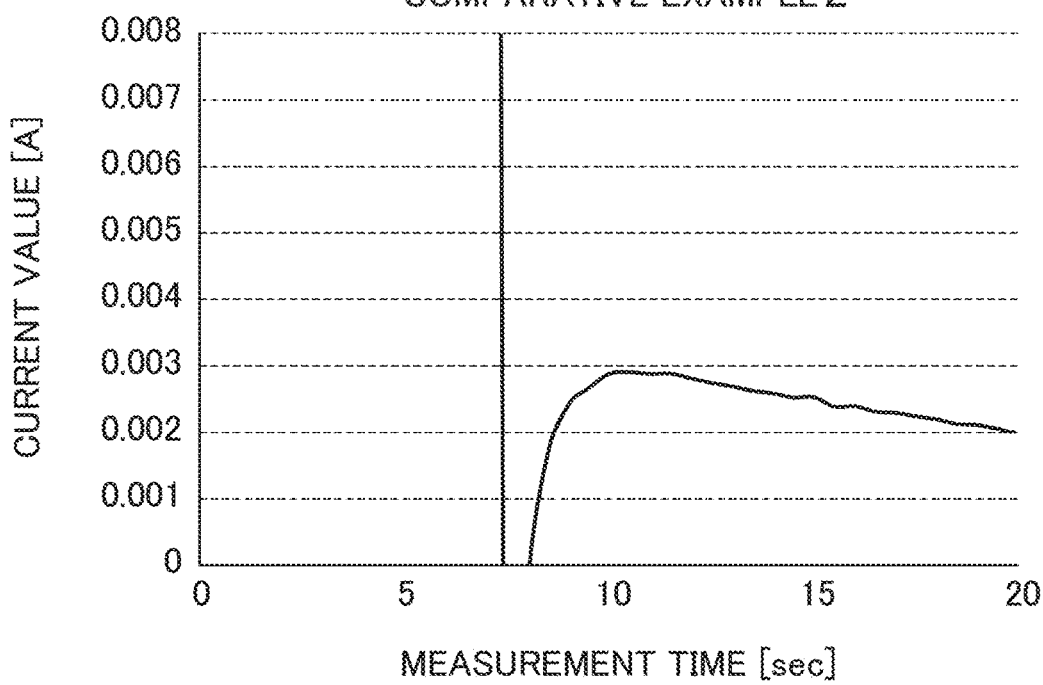
FIG. 7 is a diagram showing successive changes of a current value in current leak inspection according to Comparative Example 2 of the present invention.

The above-described Example and Comparative Examples were set to have an inspection time of total 20 seconds, and, for inspection accuracy within a relatively short time, an evaluation is performed on the basis of a change tendency of the current value. For each example, FIGS. 5 to 7 show measurement results of the successive changes in the current value, and hereinafter consideration thereof will be described. [Consideration]

Example 1

(1) Time Point of Switching from the First Voltage to the Second Voltage (1 s Time Point)

The current value increased from the starting of voltage application, and at the moment of switching of the application voltage (1 s time point), the current value did not drop to a negative value. This is because, due to a small difference in the application voltage drop and a short application time of the first voltage, a discharge voltage from the electric double layer, which was formed at the electrodes, by the first voltage was low, and an electric double layer began to be formed by the second voltage without the current being reversed.

(2) Time Point of Switching from the Second Voltage to the Third Voltage (7 s Time Point)

The current value dropped to a negative value at the moment of switching of the application voltage (7 s time point). This is because a discharge voltage from the electric double layer, which was formed at the electrodes, by the second voltage was greater than the third application voltage and the current was reversed.

(3) Until the Measurement is Ended (Until 20 s Time Point)

The current value increased to around the stationary value after about 5 seconds (12 s time point) from the moment when the application voltage was switched (7 s time point), and then was stabilized around the stationary value until the measurement is ended (20 s time point). In other words, the current value was stabilized around the stationary value after 5 seconds from the time point when the application voltage is switched, and then stabilization was maintained for about 8 seconds. It is considered that at the time point of switching from the second voltage to the third voltage, sufficient charging was performed, and thus the formation of the electric double layer at the inspection voltage was completed earlier, and the current value was converged to the stationary value.

Comparative Example 1

(1) Time Point of Switching from the First Voltage to the Second Voltage (4 s Time Point)

The current value increased from the starting of voltage application, and at the moment of switching of the application voltage (4 s time point), the current value dropped to a negative value. This is because a charging voltage formed at the electrodes by the second voltage was greater than the third application voltage and the current was reversed.

(2) Until the Measurement is Ended (Until 20 s Time Point)

The current value rapidly increased to a positive value beyond 5 mA, which was a threshold value, after about 1 second (5 s time point) from the moment of switching of the application voltage (4 s time point), and then was continuously reduced until the end of measurement (20 s time point). It is considered that since charging was not sufficient at the time point of switching the voltage, the formation of the electric double layer at the inspection voltage was not completed until the end of measurement.

Comparative Example 2

(1) Until the Time of Switching from the First Voltage to the Second Voltage (7 s Time Point)

The current value increased from the starting of voltage application, and at the moment of switching the application voltage (7 s time point), the current value dropped to a negative value. This is because a charging voltage formed at the electrodes by the second voltage was greater than the third application voltage, and the current was reversed.

(2) Until the Measurement is Ended (Until 20 s Time Point)

The current value rapidly increased to a positive value beyond 5 mA, which was a threshold value, after about 1 second (8 s time point) from the moment of switching of the application voltage (7 s time point), and then was continuously reduced to the end of measurement (20 s time point). It is considered that since charging was not sufficient at the time point of switching of the voltage, the formation of the electric double layer at the inspection voltage was not completed until the end of measurement.

[Evaluation]

(1) Current Value Stabilization Time

In Example 1, in comparison to Comparative Example 1 and Comparative Example 2, the measurement current value was stabilized to the stationary current value earlier at the inspection voltage. Thereby, according to Example 1, it was confirmed that the inspection time could be shortened.

(2) Fluctuation of the Current Value

In Example 1, in comparison to Comparative Example 1 and Comparative Example 2, fluctuation of the current value occurring after switching to the inspection voltage was small. Accordingly, it was confirmed that since the variation of values around the stationary value became small, highly accurate inspection can be performed with a small reading error. In addition, in Example 1, after switching to the inspection voltage, the current value was stabilized to the stationary value without exceeding 5 mA that is the threshold value. Accordingly, when the value exceeding 5 mA is detected, it can be immediately determined that the stabilization time is not insufficient, but a leak is occurring, and thus the inspection efficiency is confirmed as improved.

What is claimed is:

1. A method for inspecting a current leak of a fuel cell, which is provided with an anode electrode,
    a cathode electrode, and
    an electrolyte membrane sandwiched between the anode electrode and the cathode electrode, the method comprising:
    a first process in which a first voltage, which is a limit voltage of the electrolyte membrane, is applied to the fuel cell to be inspected;
    a second process in which a second voltage, which is lower than the first voltage, is applied to the fuel cell after the first process;
    a third process in which a third voltage, which is lower than the second voltage, is applied to the fuel cell after the second process; and
    a determination process in which a value of a current flowing through the fuel cell in the third process is detected, and whether the detected current value is lower than a prescribed current value is determined.

2. The method for inspecting a current leak of a fuel cell according to claim 1, wherein a voltage application time in the second process is longer than a voltage application time in the first process.

* * * * *